(12) United States Patent
Tsuji

(10) Patent No.: US 6,842,113 B2
(45) Date of Patent: Jan. 11, 2005

(54) MICROWAVE SENSOR

(75) Inventor: Masatoshi Tsuji, Ohtsu (JP)

(73) Assignee: Optex Co., Ltd., Shiga (JP)

( * ) Notice: Subject to any disclaimer, the term of this patent is extended or adjusted under 35 U.S.C. 154(b) by 46 days.

(21) Appl. No.: 10/600,696

(22) Filed: Jun. 23, 2003

(65) Prior Publication Data

US 2004/0090328 A1 May 13, 2004

(30) Foreign Application Priority Data

Jun. 27, 2002 (JP) ........................................ 2002-187699

(51) Int. Cl.[7] ............................................. G08B 13/18
(52) U.S. Cl. ........................ 340/554; 340/552; 342/28
(58) Field of Search ................... 340/554, 552, 340/541; 342/28, 61, 109, 112, 114, 127

(56) References Cited

U.S. PATENT DOCUMENTS

| | | | | |
|---|---|---|---|---|
| 4,225,858 A | * | 9/1980 | Cole et al. ................... | 340/554 |
| 4,697,184 A | * | 9/1987 | Cheal et al. .................. | 342/28 |
| 6,380,882 B1 | * | 4/2002 | Hegnauer ..................... | 342/28 |
| 6,650,276 B2 | * | 11/2003 | Lawless ........................ | 342/28 |
| 6,677,887 B2 | * | 1/2004 | Harman ........................ | 342/28 |

FOREIGN PATENT DOCUMENTS

JP           2002-8204           1/2002

* cited by examiner

Primary Examiner—Daniel Wu
Assistant Examiner—Sihong Huang
(74) Attorney, Agent, or Firm—Wenderoth, Lind & Ponack, L.L.P.

(57) ABSTRACT

MW sensor 1 in one or more embodiments of the present invention is equipped with distance identifying means 41 capable of calculating relative distance(s) from the distance identifying means to object(s) at least partially within protected area(s) based on reflected wave(s); moved distance identifying means 42 capable of calculating moved distance (s) per unit time of object(s) at least partially within protected area(s); and object determination means 43 capable of receiving output(s) from distance identifying means 41 and moved distance identifying means 42, and capable of carrying out object detection determination operations(s) such that moved-distance-per-unit-time value(s), at least one of which serves as trigger value for object detection determination, is or are set lower as relative distance(s) to object(s) at least partially within protected area(s) grow smaller. As a result, a situation may be achieved whereby object(s) is or are not determined to have been detected when plant life or the like sways due to wind at location(s) comparatively distant from MW sensor 1. In contrast thereto, when human being(s) or the like approach, reaching location(s) comparatively near to MW sensor 1, it is possible to achieve a situation whereby object detection is determined to have occurred even where the speed of movement thereof is small.

6 Claims, 3 Drawing Sheets

MICROWAVE SENSOR

BACKGROUND OF INVENTION

1. Field of Invention

The present invention relates to a microwave sensor (hereinafter "MW sensor"). In particular, the present invention pertains to a strategy for achieving improved reliability with MW sensor(s).

2. Conventional Art

Conventionally known as one type of security device is an MW sensor wherein microwaves are transmitted toward a protected area, and in the event that a person (intruder) is present within the protected area, waves reflected from that person (microwaves modulated due to the Doppler effect) are received and the person is detected.

Moreover, also known as one type of MW sensor 1 is a device which employs a plurality of microwaves of different frequencies and which is constituted so as to permit measurement of the distance to a person or other such object (hereinafter "target") present within a protected area. In this type of sensor, microwaves of, for example, two different frequencies are transmitted toward a protected area, and the difference in phase between two IF signals based on the respective reflected waves is detected. This phase difference is correlated to distance to the target, the phase difference tending to increase with increasing distance to target. In other words, the distance to the target can be measured by calculating this phase difference. Furthermore, by identifying the temporal change in this phase difference, it is also possible to determine whether the target within the protected area is moving. This makes it possible to achieve a situation whereby, for example, only moving targets within the protected area are determined to be targets (intruders) which should be detected. Below, operations for detection of phase difference between/among IF signals in this type of sensor are described.

Taking the case where IF signals based on waves produced by reflection of microwaves of two different frequencies are sinusoidal waves IFout1, IFout2 (having phase difference corresponding to distance to target) as shown at FIG. 3(a), rectangular waves A, B derived from these IF signals might respectively be as shown at FIG. 3(b). It will, moreover, be possible to measure the distance to the target by detecting the phase difference between these rectangular waves A, B (the difference in phase Δt of the rising edge at the respective rectangular waves in the drawing). Furthermore, by identifying the temporal change in the phase difference between these rectangular waves A, B, it will be possible to identify movement of the target (whether it is approaching the sensor or receding from the sensor) within the protected area.

However, when this type of sensor is used as a security sensor and the temporal change in the aforementioned phase difference is identified so that only targets moving within the protected area are determined to be targets (intruders) for detection, it is believed that there is room for improvement with respect to the following points.

In the event that this type of sensor is installed outdoors, swaying of plant life or the like due to wind can cause a phase difference to occur between the foregoing rectangular waves A, B, as a result of which it is possible that plant life or the like might be mistakenly detected as the target which is intended to be detected, resulting in generation of a false alarm.

Similarly, in the event that this type of sensor is installed indoors, rotation of fans for circulation of air or swaying of curtains or blinds due to wind can also cause a phase difference to occur between the foregoing rectangular waves A, B, as a result of which it is possible here as well that an object other than a person might be mistakenly detected as the target which is intended to be detected, resulting in generation of a false alarm.

There is accordingly a need to accurately distinguish between persons or other such targets intended to be detected and objects not so intended (plant life, fans, etc.), and to prevent false alarms.

One possible improvement addressing this point involves measuring the amount of change per unit time in the relative distance to the target within the protected area based on respective reflected waves, and causing determination to be made that the target is the target which is intended to be detected only when this amount of change is greater than or equal to some prescribed amount. In other words, in contrast to the small distances moved by plant life swaying due to wind, rotating fans, and the like, the distances moved by persons or other such objects which are intended to be detected are large. Identification of this difference makes it possible to determine whether a target is that which is intended to be detected or not.

However, the present inventor has recognized that further improvement is necessary in order to permit more accurate determination.

In accordance with the aforementioned proposal, where a target engages in a repetitive pattern of moving by a small amount and then stopping, and thereafter again moving by a small amount and then stopping, as is the case with the movement of person A shown in FIG. 2, the change in relative distance per unit time from MW sensor 1 to target A will be small, thereby preventing this target (person) A from being determined to be a target intended for detection.

The same sort of situation also exists where the target gradually advances toward MW sensor 1 while moving to the left and right, as is the case with the movement of person B shown in FIG. 2. That is, in such a case, despite the large amount of movement of target B, because the relative distance between target B and MW sensor 1 only decreases by a small amount at a time, the change in relative distance per unit time from MW sensor 1 to target B is likewise small, preventing this target (person) B from being determined to be a target intended for detection.

Furthermore, one possible means for avoiding such undetected intrusion events is to previously set the change in the amount of relative distance per unit time necessary to achieve a determination that an object is a target which should be detected (i.e., the trigger value) to a low value so as to cause generation of an alarm even where movement of a target within the protected area is small.

However, in the event of presence of the aforementioned plant life swaying due to wind, rotating fans, and the like, the foregoing stratagem will cause these to be determined to be targets intended for detection, resulting in false alarms.

SUMMARY OF INVENTION

The present invention was conceived in light of the foregoing points, it being an object thereof to provide, in an MW sensor employing microwaves to detect objects, an MW sensor making it possible to accurately distinguish between persons or other such targets intended to be detected and targets not so intended, and making it possible to avoid false alarms and undetected intrusion events.

In order to achieve the foregoing and/or other objects, one or more embodiments of the present invention, in the context of a microwave sensor capable of transmitting a plurality of microwaves of different frequency toward one or more protected areas and capable of carrying out one or more object detection operations based on at least a portion of the microwaves which are reflected from one or more objects at least partially within at least one of the protected area or areas, is characterized in that it is equipped with one or more distance identifying means capable of calculating one or more relative distance or distances from the distance identifying means to at least one of the object or objects at least partially within at least one of the protected area or areas based on at least a portion of the reflected microwaves; one or more moved distance identifying means capable of calculating one or more moved distance or distances per unit time of at least one of the object or objects at least partially within at least one of the protected area or areas; and one or more object determination means capable of receiving one or more outputs from at least one of the distance identifying means and one or more outputs from at least one of the moved distance identifying means, and capable of carrying out one or more object detection determination operations such that one or more moved-distance-per-unit-time value or values, at least one of which serves as trigger value for object detection determination, is or are set lower as at least one of the relative distance or distances to at least one of the object or objects at least partially within at least one of the protected area or areas grows smaller.

In the foregoing constitution, at least one of the determination means may be constituted so as to be capable of carrying out one or more object detection determination operations such that one or more moved-distance-per-unit-time value or values, at least one of which serves as trigger value for object detection determination, is or are set lower when at least one of the relative distance or distances from the distance identifying means to at least one of the object or objects at least partially within at least one of the protected area or areas is or are less than or equal to at least one prescribed value than when the at least one relative distance or distances is or are greater than the at least one prescribed value.

In the foregoing constitution, at least one of the distance identifying means may be constituted so as to be capable of measuring at least one of the relative distance or distances to at least one of the object or objects at least partially within at least one of the protected area or areas based on one or more phase differences between or among at least a portion of the microwaves reflected from at least one of the object or objects.

Furthermore, at least one of the moved distance identifying means may be constituted so as to be capable of receiving one or more outputs from at least one of the distance identifying means and so as to be capable of measuring one or more amounts of change in at least one of the relative distance or distances to at least one of the object or objects per unit time.

In accordance with one or more of the aforementioned constitutions, determination that object(s) has or have been detected is not made (alarm(s) is or are not generated) so long as object(s) within protected area(s) do not move by large amount(s) when that or those object(s) is or are located comparatively far from sensor(s). In contrast, in accordance with such constitution(s), when object(s) within protected area(s) is or are located comparatively near to sensor(s), determination is made that such object(s) is or are object(s) which should be detected (alarm(s) is or are generated) when that or those object(s) move by even small amount(s). Accordingly, when used as security sensor(s), the accuracy with which object(s) is or are detected may be made to increase as the threat level represented by the region in question increases. This makes it possible to eliminate the tendency for false alarms to occur in situations where there are rotating fans or in situations where blinds, curtains, or plant life located comparatively far from sensor(s) sway due to wind. Furthermore, this makes it possible for object detection determination (alarm generation) to occur with only small movement when person(s) (intruder(s)) approach to the point where location(s) comparatively near to such sensor(s) is or are reached. As a result, it being possible to avoid false alarm(s) whereby plant life swaying due to wind or the like is determined to be a target which should be detected and it being possible to avoid undetected intrusion events whereby person(s) drawing close to sensor(s) go undetected, provision of a highly reliable MW sensor is permitted.

DESCRIPTION OF PREFERRED EMBODIMENTS

Below, embodiments of the present invention are described with reference to the drawings. The present description is carried out in terms of an example in which the present invention is applied to an MW sensor for use as a security sensor, this MW sensor being such that microwaves of two different frequencies are employed for detection of target(s) (intruder(s) or the like).

Description of MW Sensor Constitution

Figure 1:
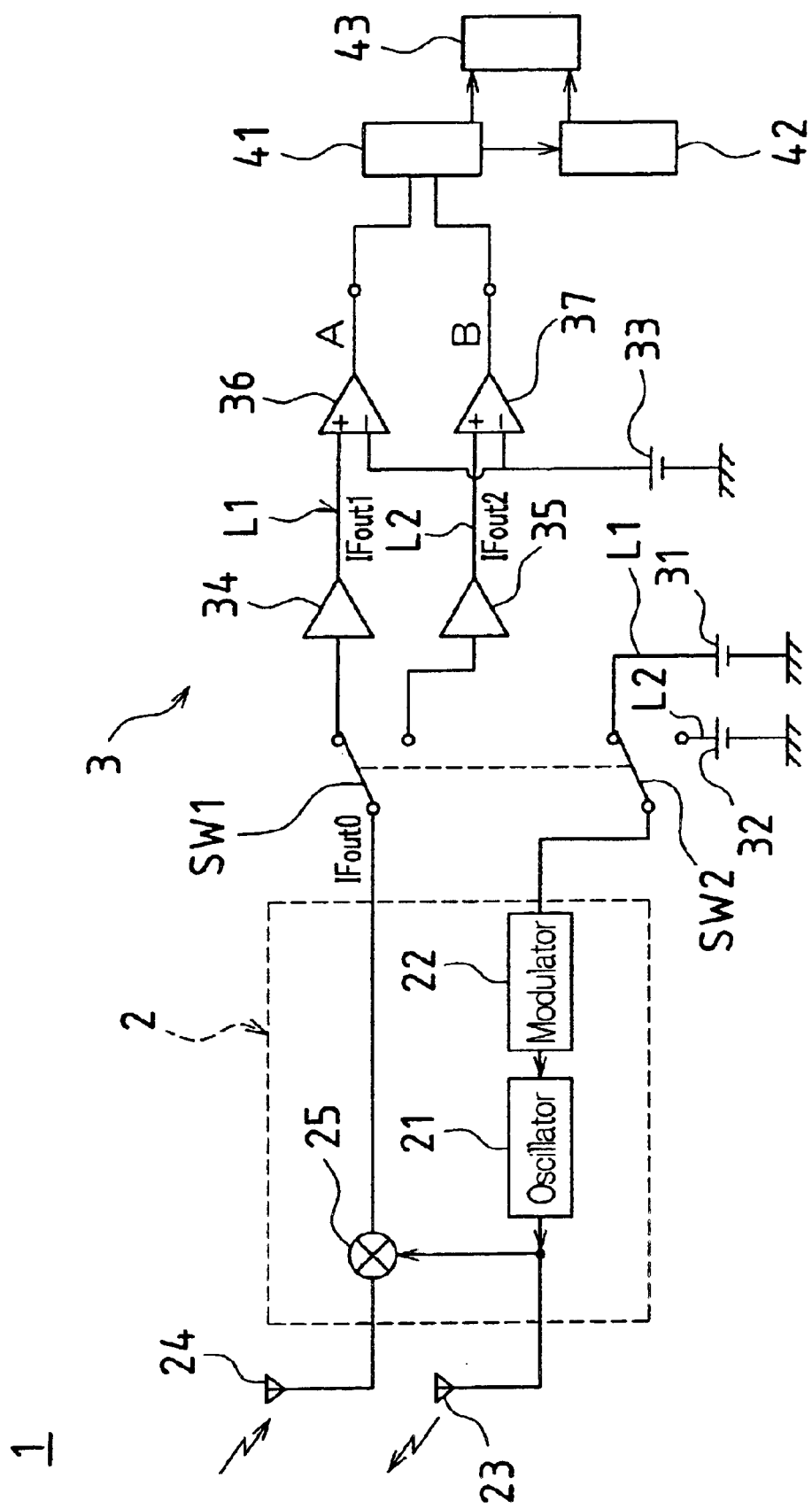
FIG. 1 is a drawing showing circuit structure in an MW sensor associated with an embodiment of the present invention.

FIG. 1 shows circuit structure in MW sensor 1 associated with the present embodiment. As shown in the drawing, MW sensor 1 is equipped with RF module(s) 2 and signal processing unit(s) 3.

RF module 2 is equipped with oscillator(s) 21 for generating microwaves, modulator(s) 22 for changing frequency or frequencies of microwaves generated by such oscillator(s) 21, transmitting antenna(s) 23 for transmitting microwaves generated by oscillator(s) 21 toward protected area(s), receiving antenna(s) 24 for receiving microwaves reflected by person(s) or other such object(s), and mixer(s) 25 for mixing such received microwaves together with voltage waveform(s) from oscillator(s) 21 before output thereof. That is, in the event that there is or are person(s) or the like within protected area(s), microwaves transmitted toward protected area(s) from transmitting antenna(s) 23 will, upon reflection by such person(s) or the like, be modulated in frequency or frequencies due to the Doppler effect before being received by receiving antenna(s) 24. After being received, such reflected wave(s) are at mixer(s) 25 mixed with voltage waveform(s) from oscillator(s) 21 before being output as IF output signal(s) (IFout0) from RF module(s) 2 to signal processing unit(s) 3.

Furthermore, signal processing unit 3 is equipped with first output line(s) and L1 and second output line(s) L2 respectively corresponding to each frequency of microwave transmitted from transmitting antenna(s) 23. Respective lines L1, L2 are equipped with power supplies 31, 32, 33, IF amplifiers 34, 35, and comparators 36, 37; distance identifying means 41, moved distance identifying means 42, and object determination means 43—which are characteristic of the present embodiment—being provided to the output side of comparators 36, 37. These respective means will be described below.

Respective IF amplifiers 34, 35 are connected to the output side of RF module 2 by way of first switch SW1. First switch SW1 performs switching so as to cause connection to first output line L1 when one of the aforementioned two varieties of microwaves is transmitted from transmitting antenna 23, and so as to cause connection to second output line L2 when the other of the aforementioned two varieties of microwaves is transmitted from transmitting antenna 23. That is, the constitution here is such that IF output signal(s) (IFout1) associated with reflected wave(s) produced by reflection from person(s) or the like during transmission of one of the aforementioned two varieties of microwaves is or are output to first output line L1, and IF output signal(s) (IFout2) associated with reflected wave(s) produced by reflection from person(s) or the like during transmission of the other of the aforementioned two varieties of microwaves is or are output to second output line L2.

Furthermore, respective power supplies 31, 32 are connected to the input side of RF module 2 by way of second switch SW2 which works in linked fashion with the aforementioned first switch SW1. Switching of this second switch SW2 likewise causes connection to be made to either of respective power supplies 31, 32 depending on which of the aforementioned two varieties of microwaves is being transmitted from transmitting antenna 23. That is, the constitution here is such that modulator 22 is switched between two different microwave frequencies depending upon whether this second switch SW2 makes connection to the one power supply 31 or the other power supply 32, thus permitting the frequency of the microwaves transmitted from transmitting antenna 23 to be switched.

In accompaniment to switching operations occurring at respective switches SW1, SW2, switching thus occurs at regular time intervals (e.g., every several ms) between first processing operations wherein one of the aforementioned two varieties of microwaves is transmitted from transmitting antenna 23 toward protected area(s) and IF output signal(s) (IFout1) based on wave(s) produced by reflection thereof is or are output to first output line L1 of signal processing unit 3, with signal processing taking place at this first output line L1; and second processing operations wherein the other of the aforementioned two varieties of microwaves is transmitted from transmitting antenna 23 toward protected area (s) and IF output signal(s) (IFout2) based on wave(s) produced by reflection thereof is or are output to second output line L2 of signal processing unit 3, with signal processing taking place at this second output line L2. In addition, during the respective first and second processing operations, IF output signals output from RF module 2 are amplified by IF amplifiers 34, 35, the outputs from such IF amplifiers 34, 35 being shaped into rectangular waves by comparators 36, 37 before being output to distance identifying means 41.

Moreover, describing the aforementioned respective first and second processing operations in further detail, in the event that there is no person or other such object within protected area(s), because frequencies of microwaves transmitted by transmitting antenna 23 will be equal to frequencies of microwaves received by receiving antenna 24, the IF frequencies of the signals output from IF amplifiers 34, 35 will be "0," and no signal will be output from comparators 36, 37.

In contrast thereto, in the event that there is or are person(s) or other such object(s) within protected area(s), because frequencies of microwaves received by receiving antenna 24 will be modulated relative to frequencies of microwaves transmitted by transmitting antenna 23, there will be a change in the output signal waveforms from comparators 36, 37, the rectangular waves therefrom being output to distance identifying means 41.

Description of Respective Means 41, 42, 43

Described next are distance identifying means 41, moved distance identifying means 42, and object determination means 43, these being for carrying out determination of whether object(s) should be deemed detected based on output signal waveforms from comparators 36, 37.

Distance identifying means 41 receives output signal waveforms from comparators 36, 37 and calculates relative distance(s) to object(s) within protected area(s) based on these output signal waveforms. That is, this means is constituted so as to be capable of measuring relative distance(s) to object(s) within protected area(s) based on phase difference(s) between or among respective microwaves reflected from the object(s). As described above, the difference in phase between the two IF output signals (IFout1, IFout2) is correlated to distance to object (target), phase differences tending to increase with increasing distance to object. Distance identifying means 41 is constituted so as to be capable of measuring distance(s) to object(s) by calculating such phase difference(s).

Moved distance identifying means 42 is capable of calculating moved distance(s) per unit time of object(s) within protected area(s) (e.g., the actual distance(s) moved by object(s) in 1 sec). That is, this means is constituted so as to be capable of receiving output(s) from distance identifying means 41, and so as to be capable of calculating moved distance(s) per unit time by measuring amount(s) of change in relative distance(s) to object(s) per unit time.

Object determination means 43 is constituted so as to be capable of receiving output(s) from the aforementioned distance identifying means 41 and moved distance identifying means 42, and so as to be capable of carrying out object detection determination operations(s) such that "moved-distance-per-unit-time value(s)," serving as trigger value(s) for object detection determination, is or are set lower as relative distance(s) to object(s) within protected area(s) grow smaller. That is, the constitution here is such that determination that object(s) has or have been detected is not made (alarm(s) is or are not generated) so long as object(s) within protected area(s) do not move by large amount(s) when that or those object(s) is or are located comparatively far from MW sensor(s) 1. In contrast, the constitution here is such that when object(s) within protected area(s) is or are located comparatively near to MW sensor(s) 1, determination is made that such object(s) is or are object(s) which should be detected, generating object detection signal(s) and causing alarm(s) to be generated, when that or those object(s) move by even small amount(s).

Accordingly, under circumstances where, for example, plant life at location(s) comparatively far from MW sensor 1 sways due to wind, this will not be determined to be an object which is intended for detection and this will not tend to cause false alarms. Furthermore, this makes it possible for object detection determination (alarm generation) to occur with only small movement when person(s) (intruder(s)) approach to the point where location(s) comparatively near to MW sensor(s) 1 is or are reached, eliminating undetected intrusion events.

The foregoing operations will now be described in more specific terms. Relative distance from MW sensor 1 to an object may be calculated using Formula (1), below.

$$R = c \cdot \Delta\phi / 4\pi \cdot \Delta f \tag{1}$$

(R=relative distance to object; c=speed of light; Δϕ=difference in phase between rectangular waves A, B; Δf=difference in frequency between two varieties of microwaves generated by oscillator 21)

Distance identifying means 41 uses Formula (1), above, to calculate distance(s) to object(s) at regular intervals a prescribed time apart. Furthermore, moved distance identifying means 42 measures amount(s) of change per unit time in such relative distance(s) to object(s). In addition, when the foregoing amount(s) of change (distance(s) moved by object (s)) is or are large as compared with trigger value(s) ("moved-distance-per-unit-time value(s)" for determining whether object(s) should be deemed to have been detected) previously set in correspondence to relative distance(s) to object(s), object determination means 43 determines that such object(s) is or are object(s) (person(s)) which should be detected and generates object detection signal(s).

Below, trigger value(s) which may be set at object determination means 43 is or are described in more specific terms. For a distance of 20 m from MW sensor 1, the moved distance value for determining that an object has been detected (trigger value) might be set to "distance moved in 1 sec=3 m." In other words, object detection determination (alarm generation) would not occur so long as the object does not move 3 m or more in 1 sec.

Furthermore, for a distance of 10 m from MW sensor 1, the moved distance value for determining that an object has been detected might be set to "distance moved in 1 sec=2 m." In other words, object detection determination would not occur so long as the object does not move 2 m or more in 1 sec.

Figure 2:
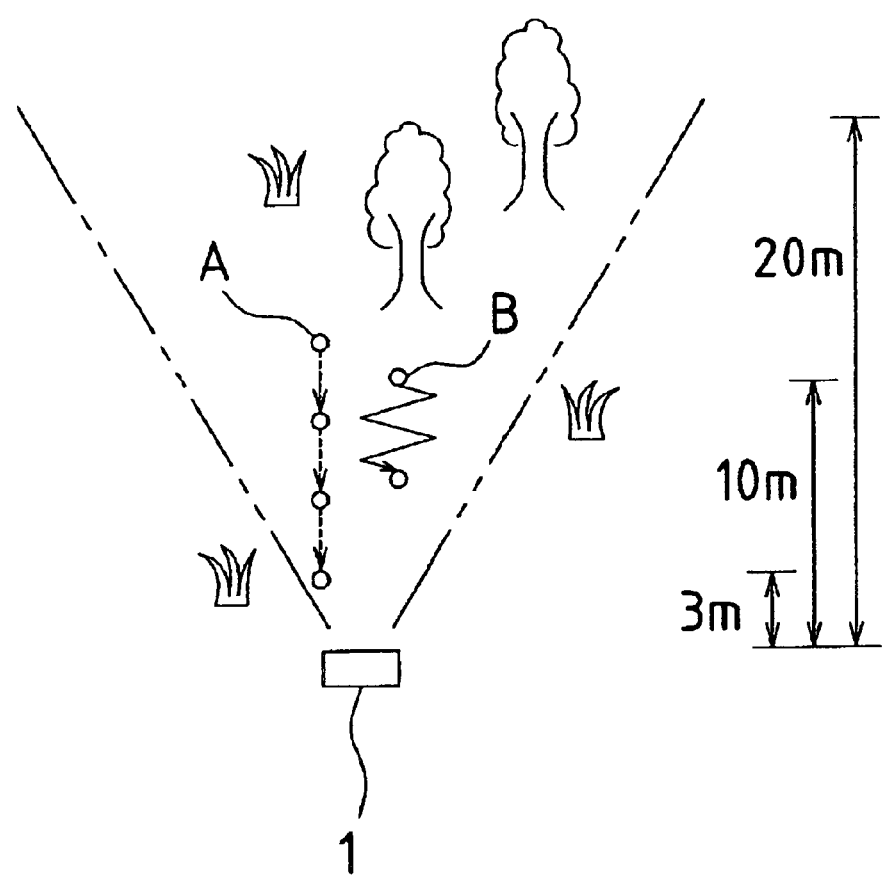
FIG. 2 is a drawing showing the location at which an MW sensor might be installed and the area protected thereby.
Figure 3:
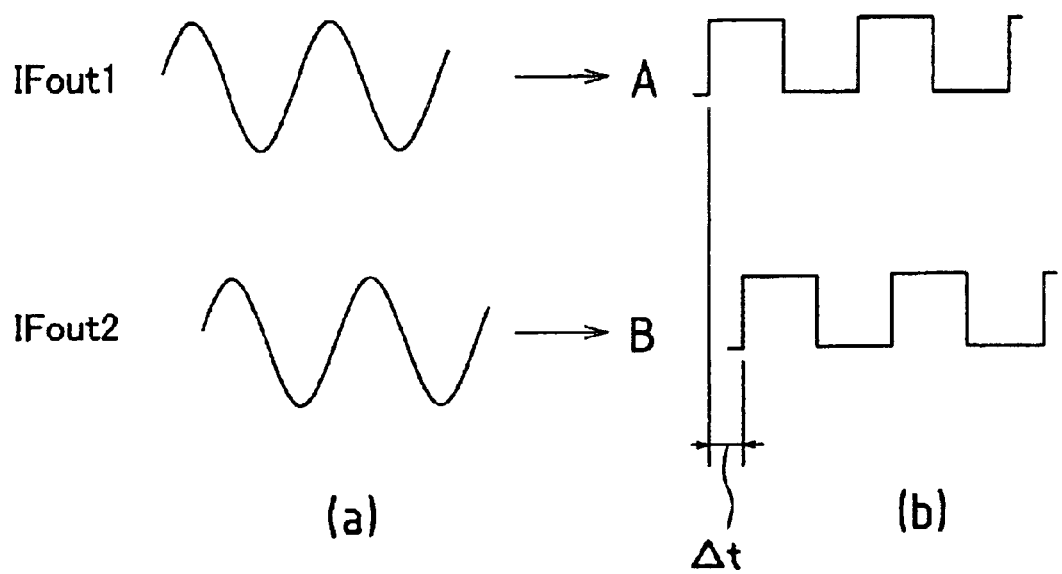
FIG. 3 is a drawing showing respective IF signals as well as rectangular waves which might be obtained therefrom in a conventional example.

Moreover, for a distance of 3 m from MW sensor 1, the moved distance value for determining that an object has been detected might be set to "distance moved in 1 sec=0.3 m." In other words, this would cause object detection determination to occur if the object moves as little as 0.3 m in 1 sec (see FIG. 2).

Note that such respective moved distance values representing trigger values for object detection determination may be set so as to grow smaller for locations nearer to MW sensor 1, and such values may be set so as to decrease in stepwise fashion after the fashion of 3 m per 1 sec for distances from MW sensor 1 which are within the range 20 m to 10 m, 2 m per 1 sec for the range 10 m to 3 m, and 0.3 m per 1 sec for the range below 3 m.

Note also that in such a case, whereas it is possible that false alarms could occur in the event that plant life present at distances from MW sensor 1 in the range below 3 m sways due to wind, if the location at which MW sensor 1 is installed is previously set, as shown in FIG. 2, such that plant life is not present in the range below 3 m, such problems can be avoided. At this FIG. 2, the area protected by MW sensor 1 is indicated by the double-dash chain line.

The foregoing constitution makes it possible to achieve a situation whereby object(s) is or are not determined to have been detected, for example, when plant life or the like sways due to wind at location(s) comparatively distant from MW sensor 1. Where, for example, plant life sways due to wind at a location 10 m from MW sensor 1, the distance moved by plant life in 1 sec might be on the order of 0.5 m at the greatest. In other words, because the foregoing trigger value of 2 m is not reached, such plant life will not be determined to be an object which should be detected. In contrast thereto, when human being(s) or the like approach, reaching location (s) comparatively near to MW sensor 1, it will be possible to achieve a situation whereby object detection is determined to have occurred even when the distance moved is small. It will, for example, be possible to cause object detection determination to occur when an intruder at a location 3 m from MW sensor 1 moves as little as 0.4 m in 1 sec.

As a result, it being possible to avoid false alarm(s) whereby plant life swaying due to wind or the like is determined to be an object which should be detected and it being possible to avoid undetected intrusion events whereby person(s) drawing close to MW sensor(s) 1 go undetected, provision of a highly reliable MW sensor 1 is permitted.

The foregoing respective embodiments have been described in terms of an MW sensor 1 employing microwaves of two different frequencies to measure distance(s) to object(s) for detection. The present invention is, however, not limited thereto, it being possible for such MW sensor 1 to employ microwaves of three or more different frequencies to measure distance(s) to object(s) for detection.

Furthermore, in the descriptions of the foregoing respective embodiments, plant life was presented as an example of an object which might not be intended to be detected. The present invention is, however, not limited thereto, it being possible, under circumstances where blinds or curtains sway due to wind or under circumstances where fans for circulation of air rotate, for such objects to serve as objects not intended for detection.

Furthermore, the aforementioned "moved-distance-per-unit-time value(s)" which serve as trigger value(s) are not limited to the foregoing numerical values, it being possible to set same as appropriate in correspondence to the environment in which MW sensor 1 is installed.

Furthermore, MW sensor 1 of the present invention may be employed in applications other than security sensors.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing date of Japanese Patent Application No. 2002-187699, the content of which is incorporated herein by reference in its entirety. Furthermore, all references cited in the present specification are specifically incorporated herein by reference in their entirety.

What is claimed is:

1. In the context of a microwave sensor for transmitting a plurality of microwaves of different frequency toward one or more protected areas and carrying out one or more object detection operations based on at least a portion of the microwaves which are reflected from one or more objects at least partially within at least one of the protected area or areas, a microwave sensor characterized in that it is equipped with one or more distance identifying means for calculating one or more relative distance or distances from the distance identifying means to at least one of the object or objects at least partially within at least one of the protected area or areas based on at least a portion of the reflected microwaves;

one or more moved distance identifying means for calculating one or more moved distance or distances per unit time of at least one of the object or objects at least partially within at least one of the protected area or areas; and one or more object determination means for receiving one or more outputs from at least one of the distance identifying means and one or more outputs from at least one of the moved distance identifying means, and for carrying out one or more object detection determination operations such that one or more moved distance-per-unit-time value or values, at least one of which serves as trigger value for object detection determination, is or are set lower as at least one of the relative distance or distances to at least one of the object or objects at least partially within at least one of the protected area or areas grows smaller.

2. In the context of a microwave sensor for transmitting a plurality of microwaves of different frequency toward one or more protected areas and for carrying out one or more object detection operations based on at least a portion of the microwaves which are reflected from one or more objects at least partially within at least one of the protected area or areas, a microwave sensor characterized in that it is equipped with one or more distance identifying means for calculating one or more relative distance or distances from the distance identifying means to at least one of the object or objects at least partially within at least one of the protected area or areas based on at least a portion of the reflected microwaves;

one or more moved distance identifying means for calculating one or more moved distance or distances per unit time of at least one of the object or objects at least partially within at least one of the protected area or areas; and one or more object determination means for receiving one or more outputs from at least one of the distance identifying means and one or more outputs from at least one of the moved distance identifying means, and for carrying out one or more object detection determination operations such that one or more moved-distance per-unit-time value or values, at least one of which serves as trigger value for object detection determination, is or are set lower when at least one of the relative distance or distances to at least one of the object or objects at least partially within at least one of the protected area or areas is or are less than or equal to at least one prescribed value than when the at least one relative distance or distances is or are greater than the at least one prescribed value.

3. A microwave sensor according to claim 1 characterized in that at least one of the distance identifying means is constituted so as to measure at least one of the relative distance or distances to at least one of the object or objects at least partially within at least one of the protected area or areas based on one or more phase differences between or among at least a portion of the microwaves reflected from at least one of the object or objects.

4. A microwave sensor according to claim 1 characterized in that at least one of the moved distance identifying means is constituted so as to receive one or more outputs from at least one of the distance identifying means and so as to measure one or more amounts of change in at least one of the relative distance or distances to at least one of the object or objects per unit time.

5. A microwave sensor according to claim 2 characterized in that at least one of the distance identifying means is constituted so as to measure at least one of the relative distance or distances to at least one of the object or objects at least partially within at least one of the protected area or areas based on one or more phase differences between or among at least a portion of the microwaves reflected from at least one of the object or objects.

6. A microwave sensor according to claim 2 characterized in that at least one of the moved distance identifying means is constituted so as to receive one or more outputs from at least one of the distance identifying means and so as to measure one or more amounts of change in at least one of the relative distance or distances to at least one of the object or objects per unit time.

* * * * *